No. 634,759. Patented Oct. 10, 1899.
V. KOCH.
CROSSING FOR UNDERGROUND CONDUITS FOR ELECTRICAL CONDUCTORS.
(Application filed June 17, 1899.)
(No Model.) 2 Sheets—Sheet 1.
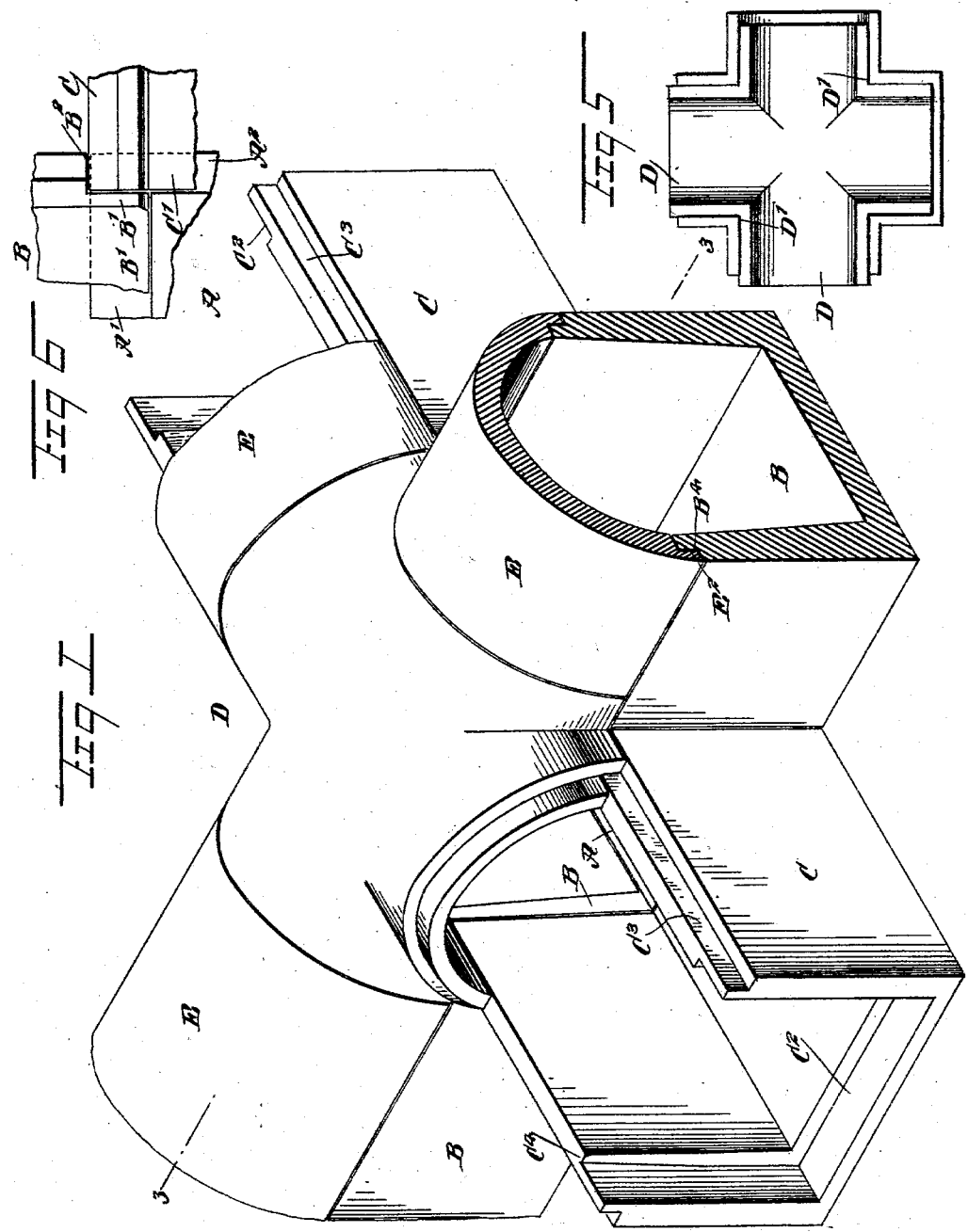
WITNESSES:
INVENTOR
Victor Koch
BY
ATTORNEYS No. 634,759. Patented Oct. 10, 1899.
V. KOCH.
CROSSING FOR UNDERGROUND CONDUITS FOR ELECTRICAL CONDUCTORS.
(Application filed June 17, 1899.)
(No Model.) 2 Sheets—Sheet 2.
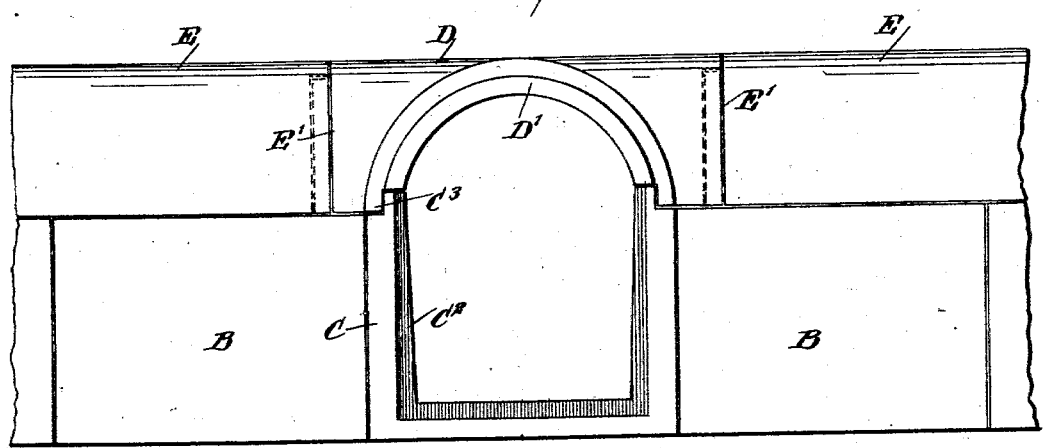
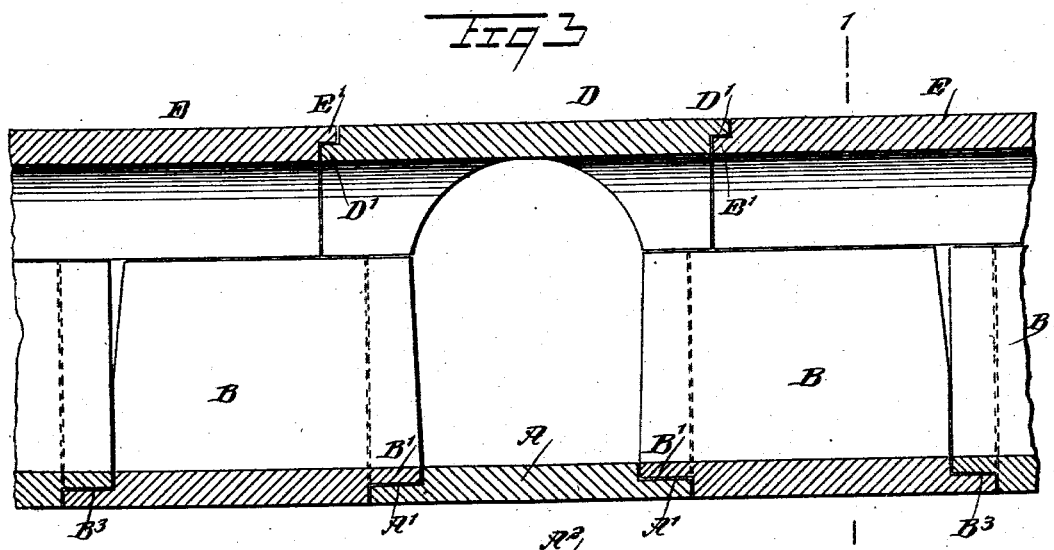
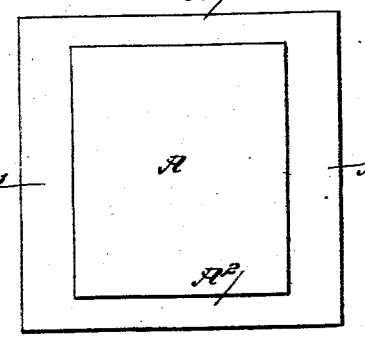

UNITED STATES PATENT OFFICE.

VICTOR KOCH, OF SCRANTON, PENNSYLVANIA.

CROSSING FOR UNDERGROUND CONDUITS FOR ELECTRICAL CONDUCTORS.

SPECIFICATION forming part of Letters Patent No. 634,759, dated October 10, 1899.

Application filed June 17, 1899. Serial No. 720,970. (No model.)

*To all whom it may concern:*

Be it known that I, VICTOR KOCH, of Scranton, in the county of Lackawanna and State of Pennsylvania, have invented a new and Improved Underground Conduit for Electrical Conductors, of which the following is a full, clear, and exact description.

The object of the invention is to provide a new and improved underground conduit for electrical conductors arranged to thoroughly protect the conductors from moisture and to permit of gaining ready access to the conductors for repairs and other purposes.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional perspective view of the improvement at a crossing, the section being on the line 1 1 in Fig. 3. Fig. 2 is a side elevation of the same. Fig. 3 is a longitudinal sectional elevation of the same on the line 3 3 in Fig. 1. Fig. 4 is a plan view of the base for the crossing. Fig. 5 is an inverted reduced plan view of the cover for the crossing, and Fig. 6 is a plan view of one corner of the crossing with the cover removed.

The underground conduit is provided at a crossing with a base A, (shown in detail in Fig. 4,) the base being formed on top with oppositely-arranged rabbets A' A' and a set of rabbets $A^2$ $A^2$, somewhat less in width than the rabbets A' A'. The rabbets A' A' are adapted to receive the tongues B' of longitudinal trough-sections B, and the rabbets $A^2$ $A^2$ are adapted to receive the tongues C' of transverse trough-sections C. The tongues B' at the ends of the sections B are extended along the bottom and sides of a U-shaped cross-section, so as to form a rabbet $B^2$ on the sides for the reception of the corresponding inner end of the trough-section C, as will be readily understood by reference to Fig. 6. Thus each section is formed with a projecting tongue B' extending at the bottom and the sides, while the tongue C' of the cross-section extends only along the bottom, and the vertical portion of this section is adapted to pass into the vertical rabbet $B^2$, so that a perfect joint is obtained between the base and the longitudinal and the transverse sections, as will be readily understood by reference to Fig. 6.

The outer ends of the sections B and C are formed with inner rabbets $B^3$ and $C^2$, respectively, for receiving corresponding tongues at the following sections, completing the longitudinal as well as the transverse conduit. Each of the sections at the crossing is formed at the top with tongues and grooves $B^4$ and $C^3$, as is plainly shown in Fig. 1, to receive corresponding tongues and grooves at D' of a cover D, made in the shape of a cross and arch-shaped, as is plainly indicated in the drawings.

The longitudinal and transverse sections are covered by arch-shaped covers E, having tongue-and-groove connections $E^2$ with the tongues and grooves $B^4$ and $C^3$ of the longitudinal and transverse sections. The covers E, adjacent to the crossing-cover D, are likewise connected by tongues and grooves, as will be readily understood by reference to Fig. 3, so that moisture is not liable to pass into the interior of the conduit either in a longitudinal or a transverse section or at the crossing.

In making the various parts of the conduit I prefer to employ glass or other material totally impervious to water and moisture, so that the conductors placed in a conduit are perfectly safe from the influence of moisture, and consequently interruptions in telegraphic, telephonic, or other electric lines are not liable to take place.

Having thus fully described my invention, I claim as new and desire to secure by Letters Patent—

1. A crossing for underground conduits, comprising longitudinal and transverse trough-sections, a base between the sections and with which the sections are in engagement, and an arched cross-shaped cover-section fitting upon the upper edges of the trough-sections, substantially as described.

2. A crossing for underground conduits, comprising a base, longitudinal trough-sections engaging opposite sides of the base and having their sides at the inner ends rabbeted, transverse trough-sections having the inner ends of their bottoms rabbeted to fit upon the other sides of the base with their ends fitting in the rabbets of the longitudinal sections, and a cover for said trough-sections, substantially as described.

3. A crossing for underground conduits for electrical conductors, comprising a base having its top recessed or rabbeted along the sides, oppositely-arranged longitudinal trough-sections having projecting tongues continuous along the bottom and sides, the bottom portions engaging the corresponding rabbets in said base, and a set of oppositely-arranged transverse trough-sections provided at one end with projecting tongues for engaging the corresponding rabbets on the base, the sides of the transverse sections being adapted to fit in the rabbets on the sides of the longitudinal sections, substantially as shown and described.

4. A crossing for underground conduits for electrical conductors, comprising a base having its top recessed or rabbeted along the sides, oppositely-arranged longitudinal trough-sections having projecting tongues continuous along the bottom and sides, the bottom portions engaging the corresponding rabbets in said base, a set of oppositely-arranged transverse trough-sections provided at one end with projecting tongues for engaging the corresponding rabbets on the base, the sides of the transverse sections being adapted to fit in the rabbets on the sides of the longitudinal sections, and an arched cross-shaped cover-section fitting upon the upper ends of said longitudinal and transverse sections, substantially as shown and described.

5. A crossing for underground conduits for electrical conductors, comprising a base having its top recessed or rabbeted along the sides, oppositely-arranged longitudinal trough-sections having projecting tongues continuous along the bottom and sides, the bottom portions engaging the corresponding rabbets in said base, a set of oppositely-arranged transverse trough-sections provided at one end with projecting tongues for engaging the corresponding rabbets on the base, the sides of the transverse sections being adapted to fit in the rabbets on the sides of the longitudinal sections, and an arched cross-shaped cover-section fitting upon the upper ends of said longitudinal and transverse sections, the connections between the cover and said sections being by tongues and grooves, substantially as shown and described.

VICTOR KOCH.

Witnesses:
JAMES J. O'MALLEY,
W. H. CAMPBELL.